TELEGRAPH SIGNAL REGENERATOR APPARATUS

Filed July 26, 1949 3 Sheets-Sheet 1

INVENTOR
HENDRIK C. A. VAN DUUREN

BY Brown, Jackson, Boettcher & Dienner
ATTORNEYS

TELEGRAPH SIGNAL REGENERATOR APPARATUS

Filed July 26, 1949 3 Sheets-Sheet 2

INVENTOR
HENDRIK C. A. VAN DUUREN

BY Brown, Jackson, Boettcher & Dienner
ATTORNEYS

TELEGRAPH SIGNAL REGENERATOR APPARATUS

Filed July 26, 1949 3 Sheets-Sheet 3

INVENTOR
HENDRIK C. A. VAN DUUREN

BY Brown, Jackson, Boettcher & Dienner
ATTORNEYS

Patented Nov. 10, 1953 2,658,944

UNITED STATES PATENT OFFICE 2,658,944

TELEGRAPH SIGNAL REGENERATOR APPARATUS

Hendrik C. A. van Duuren, Wassenaar, Netherlands, assignor to Staatsbedrijf der Posterijen, Telegrafie en Telefonie, The Hague, Netherlands Application July 26, 1949, Serial No. 106,847

Claims priority, application Great Britain October 6, 1948

16 Claims. (Cl. 178—70)

Figure 1:
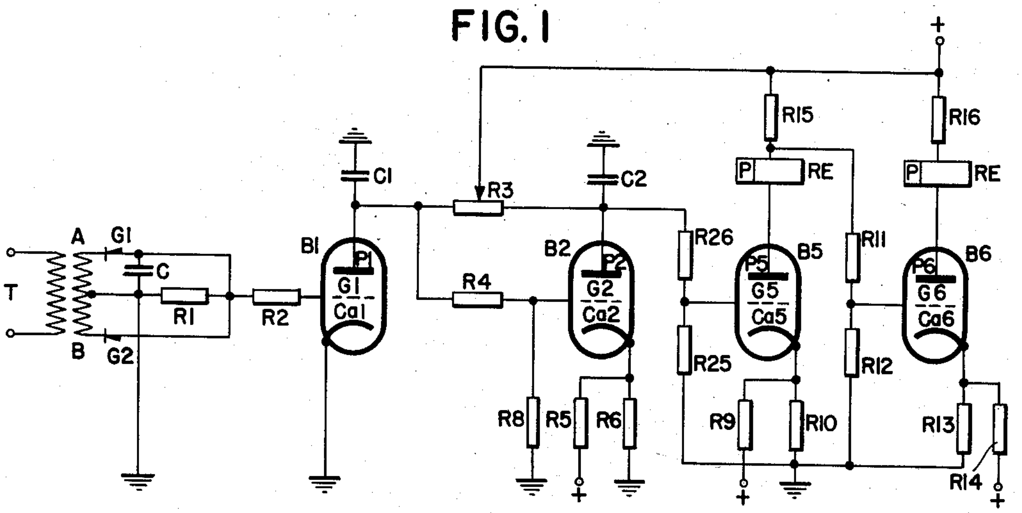

This invention relates to telegraph signal apparatus and, more particularly, to a signal regenerator for regenerating telegraph signals, as received over interconnecting links, into values suitable for use with associated impulse receiver analyzer equipment.

In conventional type telegraphy systems, transmission of information between remote geographical points is normally effected through the medium of selectively generated "marking" and "spacing" signal pulses which are grouped in given code combinations, as for example, the combinations taught by the well known Baudot five unit code. Each combination of marking and spacing elements is assigned to represent an alphabetical letter or numeral, and transmission of the proper series of combinations of spacing and marking pulses thus achieves transmission of intelligible information.

Generally speaking, signal transmission is accomplished by single wave or double wave transmission over conventional channels including radio carrier and metallic links.

In the single wave systems, the marking and spacing signals may be transmitted by the alternative application and removal of a single wave, the concept of the arrival of marking current being the same as the cessation of spacing current. In the double wave systems, the marking and spacing signals may be transmitted as pulses of alternative frequencies.

In the transmission of signals over these channels, the signals are frequently subjected to foreign disturbances which cause sufficient pulse distortion to effect the printing of an erroneous signal. In the transmission of signals over radio links of a telegraph system, for example, signal elongation due to atmospheric conditions during certain periods of the day is particularly common and signal mutilation during such time is frequently experienced.

The present invention is directed to the provision of a signal regenerator for use with the receiving equipment of a telegraph system, which regenerator is adapted to provide mark and space elements of proper ratios responsive to receipt of signals which may have been distorted in transmission.

Specifically, the invention refers to a device to be inserted between a receiver output furnishing a low frequency signal, the amplitude of which has been brought as far as possible between certain limits and which is otherwise a more or less true representation of the received radio wave, and a receiver adapted to analyze the radio signal as to the meaning contained in its time sequence; the said device permitting the shaping of radio signals consisting of a significant alternation of marking and spacing impulses.

A feature of the arrangement is the manner in which the signal regenerating equipment is operative to provide signals of the proper ratio responsive to receipt of incoming signals of maximum distortion, such operation being effected by adjustment of a single control member to a point which effects a twofold compensation for the amount of mean signal distortion observed.

A further feature is the manner in which this novel type signal regenerator is readily adapted for use in any of the conventional types of telegraphy systems.

The operation of the equipment with the several types of systems becomes more apparent with reference to the accompanying drawings which show, by way of example, different circuit arrangements of the signal regenerator equipment.

Figure 4:
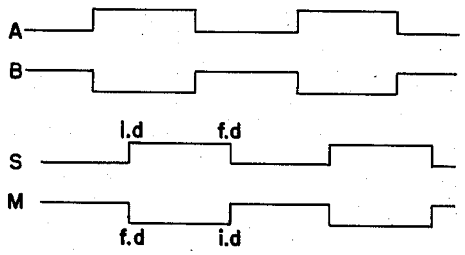
Figure 3:
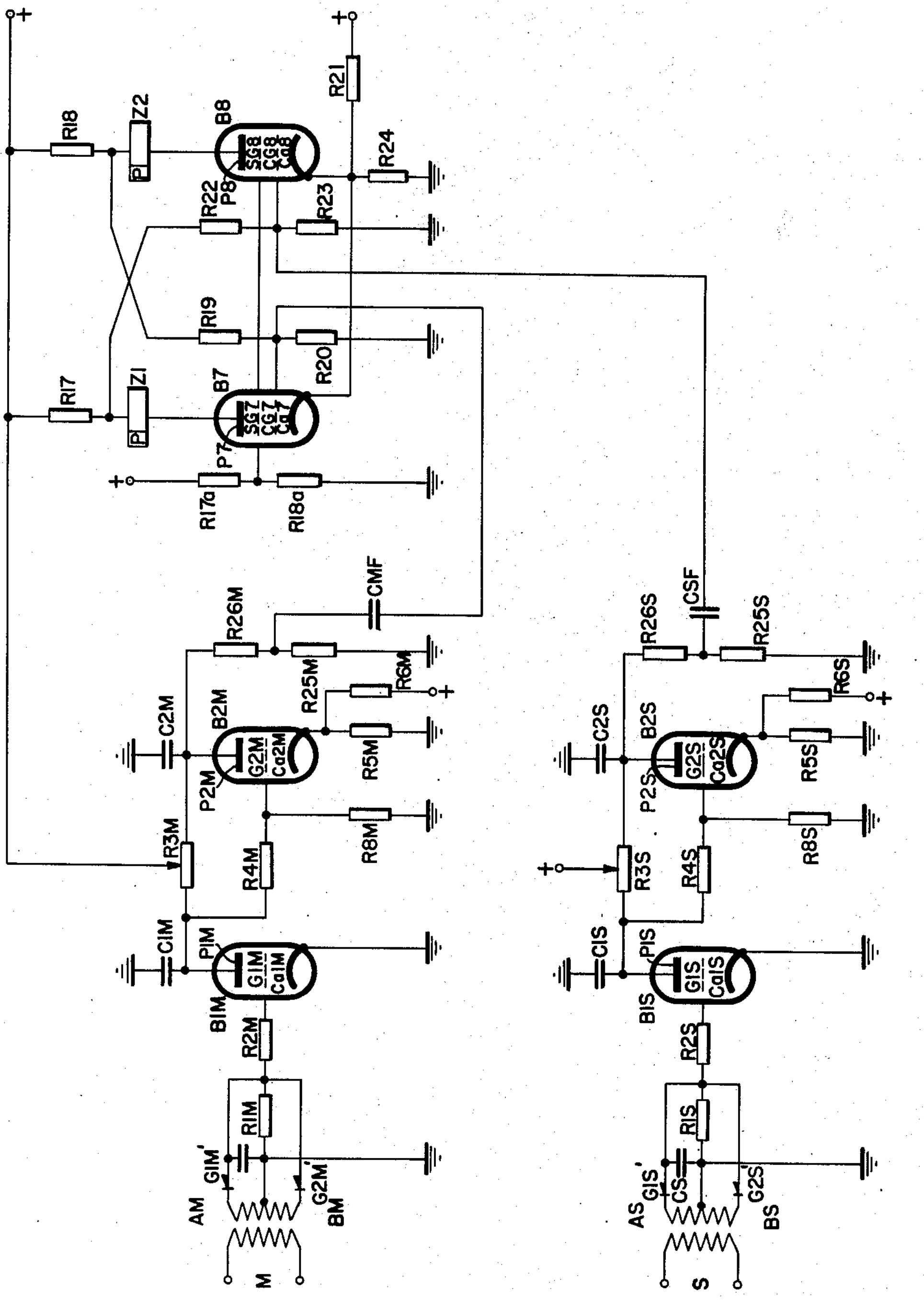

In the drawings:

Figure 1 is a circuit diagram of the novel signal generator adapted for use in a single wave type system;

Figures 2*p* to 2*s'''* are impulse time diagrams illustrative of the manner (and times) in which the signal regenerations are effected by the novel equipment;

Figure 3 is a circuit diagram of the novel signal generator as adapted for use in a double-wave type system; and Figure 4 shows graphic time representations illustrative of the spacing and marking impulses as effected in the signal generator of Figure 3.

*General description*

The signal regenerator of the invention basically comprises a device for insertion between the output of a radio receiver and the input stage of a signal analyzer of a telegraphy system. As will hereinafter appear the signal regenerator comprises an electronic arrangement adapted to receive the signal output of the radio receiver and to supply the analyzer connected to its output side with signals in the correct rhythm, despite distortion of the input signals.

The input stage may basically comprise a rectifier bridge and an inverter stage comprising a pair of electronic vacuum-tube units connected in such a manner that the one of the tubes is biased to cutoff and the other tube is normally conductive.

The rectifier bridge is operative with receipt of marking current to effect cutoff of the first inverter tube and to render conductive the second tube.

An RC circuit associated with the inverter stage is operative to introduce a predetermined time delay between the time of receipt of the incoming signal and the time of accomplishment of the described stage inversion. The RC circuit also controls, with the inverter tubes, the operation of a second inverter stage identifier which is known as a so-called "flip-flop" arrangement. This flip-flop stage comprises a second pair of electronic tubes, one of which is biased to cutoff and the other of which is conductive. The flip-flop tubes are operated to an inverse condition with operation of the first inverter stage and remain in said inverse condition for a given predetermined period following inversion of the initial inverter stage. The flip-flop stage, in operation between these several conditions, controls operation of an interconnected output impulse relay alternatively between the marking and spacing positions.

The RC circuit includes a variable resistor, which as adjusted to a given midpoint position, controls the signal regenerator stage to reproduce a transition from spacing to marking condition from the input to the output side of the regenerator with a delay (initial delay) which is the same as the delay with which a transition from marking to spacing condition is so reproduced (final delay). The reproduction does not take place if the time between successive input transitions (impulse length) is shorter than the respective delays the regenerator would introduce. Thus a marking impulse which is initiated by a transition of the first kind, and to which therefore the initial delay would be applied, will not be reproduced if it is too short i. e. if its termination by a transition of the second kind—and to which the final delay would be applied—follows too rapidly, i. e. before the exipration of the initial delay. Analogous considerations apply to short spacing impulses, which thus—no more than short marking impulses—are not reproduced, the limit in the latter case being the final delay however.

Figure 2:
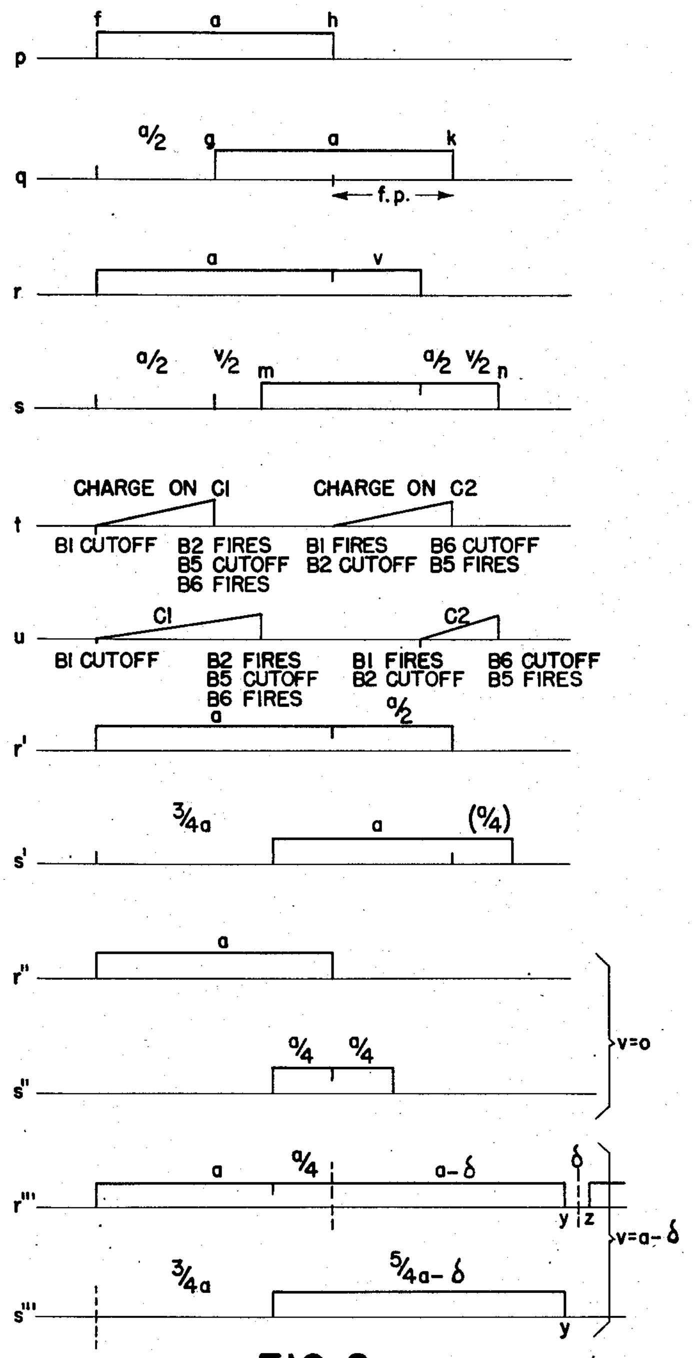

With reference to Figure 2*p* there is shown thereat a marking signal, which when applied to the input side of the signal regenerator, will be reproduced as an outgoing signal as shown in Figure 2*q* (the resistor means being set in the midpoint position). As there shown an initial delay period $fg$ expires prior to retransmission of the signal, this period being equivalent to ½ the impulse length. Also, the outgoing pulse is generated for a period $hk$ which is subsequent to termination of receipt of the incoming pulse.

As heretofore pointed out, elongation of the signal impulses is frequently caused during transmission over radio links by adverse atmospheric conditions. It is known in the art that such elongation generally occurs in periods separated by undistorted intervals of some hours, and therefore each of the incoming signals for such period may be considered as being elongated by a given mean length. The pulse signal regenerator of the invention is operative in its adjustment to various positions to reproduce signals which are elongated by such mean length correctly as outgoing signals of the desired length.

With reference to Figure 2*r*, there is there shown an incoming impulse which is elongated by a length $v$. Upon receipt of an impulse of this nature in a conventional type system, the signal is frequently unsuitable for analyzation in that the mark elongation may cause a corresponding reduction in the length of a subsequent space signal.

According to the invention, the elongation of the impulses as received is determined and the signal regenerator is adjusted to compensate therefore and thereby provide a reshaped signal of equal duration to that which was originally transmitted. With reference to Figure 2*s*, it will be apparent that the signal regenerator on adjustment is operative to effect the impulse of the given length by introducing a further delay in the initiation of the regenerated impulse (in fact, by lengthening such delay period by a period equal to one-half of the elongation $v$) and by reducing by a value of one-half the elongation $v$, the portion of the outgoing impulse as normally transmitted after termination of receipt of the incoming impulse. Thus, compensation for the full elongation time $v$ is effected to provide an impulse of the given normal length.

As will appear hereinafter, signals which are entirely unanalyzable by former methods, are now made usable through the novel operation of the signal regenerator of the disclosed invention. The manner in which such operation is accomplished, and the extent of the capabilities of the signal generator, will be more clearly brought out with reference to Figure 1 and the disclosure of the signal regenerator equipment as adapted for use in a single-wave type telegraphy system.

*Circuit description*

With reference to Figure 1, the input stage of the signal regenerator is shown connected to radio receiver equipment by a transformer T. As is well known in the art, mark and space elements in a single wave system are represented in the radio receiver equipment by the presence and absence of carrier oscillations, the period during which the oscillations arrive being representative of a mark element and a period during which the oscillations are absent being representative of a space element. The incoming signals as received are applied to the primary of transformer T and the signal regenerator unit.

The secondary of the transformer T is connected to a rectifier bridge of the signal generator input stage, the center point of the transformer secondary being connected to ground and an RC circuit comprising resistance R1 and a capacitor C. A rectifier G1 is connected between the RC circuit and the upper end A of the transformer secondary to form a first path for the received carrier oscillations, and a rectifier G2 is connected between the RC circuit and the lower end B of the transformer secondary winding to form a second path for the received carrier oscillations.

The output side of the rectifier bridge is connected over a resistance member R2 to the inverter stage which comprises a pair of electronic tube elements B1 and B2 connected in inverted relation for indicating the nature of the impulses received by the input bridge. Each of the tubes B1 and B2 of the inverter stage may comprise a conventional triode vacuum tube type unit having a plate P1, P2; a control grid G1, G2; and a cathode *Ca*1 and *Ca*2, respectively. Plate P1 of the first tube B1 is connected to an RC circuit comprising variable resistance unit R3 and a capacitor C1. Control grid G1 is connected over resistance R2 to the output side of the input stage and cathode Ca1 is connected to ground. Plate P1 of the first inverter tube B1 is also connected over resistance R4 to the control grid G2 of the second inverter tube, which is also connected to ground over resistance R8.

Plate P2 of the second inverter tube B2 is also connected to the RC circuit comprising the variable resistor R3 and the capacitor C2, the RC circuits thus controlling the time of operation of both of the tubes B1 and B2 in the inverter stage in accordance with the setting on the variable resistor element R3. Cathode Ca2 of the inverter tube B2 is connected to a source of potential of a predetermined value as determined by resistances R5 and R6 which are connected between positive battery and ground in network fashion.

Plate P2 of the inverter tube B2 is also connected over resistances R26 and R25 to a pair of electronic tube units B5 and B6 connected in a socalled "flip-flop" arrangement. Flip-flop tubes B5 and B6 may be conventional vacuum type triode tubes each comprising a plate P5, P6; a control grid G5, G6; and a cathode Ca5 and Ca6 respectively. Plate P5 of the first flip-flop tube B5 is connected to a source of positive potential over resistance R15 and the left hand winding of a polarized output relay RE. Control grid G5 is connected to the junction point of the resistances R26 and R25, and the cathode Ca5 is connected to a source of potential of a predetermined value as determined by the resistor network comprising resistors R9 and R10 as connected between a source of positive potential and ground.

Plate P6 of the second flip-flop tube B6 is connected to a source of positive potential over plate load resistance R16 and the right hand slugged winding of the output relay RE. Control grid G6 of flip-flop tube B6 is connected to the junction point of a pair of resistances R11 and R12 which are connected in the manner of a voltage divider between the output circuit of the first flip-flop tube B5 and ground. Cathode C6 is connected to a resistance network comprising resistors R13 and R14 which are in turn connected between a source of positive potential and ground.

*Circuit operation*

When a spacing signal is being received, the first inverter tube B1 is biased to conduct and the second inverter tube B2 is biased to cutoff by reason of the interconnected plate and grid circuit arrangement.

A large positive voltage appears on the output side of the inverter tube stage to render the control grid G5 of the first flip-flop tube B5 positive and the tube B5 conductive. The second flip-flop tube B6 is in turn rendered non-conductive as a result of their plate-grid circuit interconnection.

With the first flip-flop tube B5 normally conductive, an energizing circuit is completed for the left hand winding of the relay RE and the relay is operated to move associate contacts (not shown) to the space position.

As a mark signal of sufficient length is received (Figure 2*p*), retransmission of an element with unchanged length as shown at *gk* in Figure 2*q* is effected by the signal regenerator equipment, such signal, as shown, experiencing an inevitable delay in its passage through the regenerator equipment. The delay on receipt of a unit pulse (and with the resistor R3 set at its midpoint position) is in the order of one-half of the length of the unit pulse. Such delay does not impair the operation of the analyzer which is connected to the output side of the regenerator unit.

As will become apparent hereinafter, adjustment of resistance R3 to various points of its length effects alteration of the initial and final delay times of retransmission to effect partial compensation for receipt of elongated signals.

With reference now to Figure 1 the operation of the signal generator responsive to receipt of a signal element of unit length will now be described. As the carrier oscillations which are representative of a marking signal appears at the primary of transformer T (point *f* in Figure 2*p*) the oscillations will be introduced by the secondary AB thereof to the several paths of the rectifier bridge, to produce a negative direct current across resistance R1 which appears across resistance R2 to drive the control grid G1 of the first inverter tube B1 negative and to bias the tube B1 to cutoff (Figure 2*t*).

As the first inverter tube B1 is biased to cutoff, capacitor C1 is charged over a circuit which extends from positive battery, over the portion of resistance R3 which is to the left of the tap arm, and capacitor C1 to ground. As previously pointed out, with receipt of impulses of given length, the top on resistor R3 is set at the midpoint, and the rate of charging of the capacitor C1 is determined by the value of one-half of the resistance R3.

As the charging of capacitor C1 takes place (Figure 2*t*) a rising potential appears at the plate P1 of inverter tube B1 which is transmitted over the resistor R4 to the control grid of the second inverter tube B2. After a predetermined length of time (in the order of four milliseconds) the potential rises to the point where the negative bias provided by resistance R8 on control grid G2 is overcome, and the tube B2 is rendered conductive (point *g*, Figures 2*q* and 2*t*).

As the second inverter tube B2 strikes, a discharge circuit is completed for capacitor C2. The potential at plate P2 of the tube B2 drops sharply, which drop in potential is transmitted over resistor R26 to the control grid G5 of the flip-flop tube B5, whereupon the grid G5 is driven negative and the tube B5 to cutoff.

As the flip-flop tube B5 becomes non-conductive, a positive rising potential appears at the plate thereof and is communicated over the interconnecting resistance R11 to the control grid G6 of the second flip-flop tube B6 to drive the control grid G6 positive and to thereby render the tube B6 conductive.

As flip-flop tube B5 is rendered nonconductive, the energizing circuit for the left hand winding of relay RE is interrupted; and as the flip-flop tube B6 becomes conductive, an operating circuit is completed for the right hand winding of the output relay RE, the circuit extending from positive battery over resistance R16, the right hand winding of relay RE, flip-flop tube B6 and resistance R13 to ground.

The output relay RE responsively operates its contacts to the mark position to initiate the transmission of the outgoing pulse (point *g*, Figure 2*q*). The received carrier oscillations which represent the incoming mark impulse maintained the signal regenerator in this condition, i. e. tube B1 cutoff, tube B2 conductive, tube B5 cutoff, tube B6 conductive and relay RE in the mark position. This continues during the period *fh* shown in Figure 2*p*.

Thus the initial delay period which elapses prior to the regeneration of the signal following receipt of the incoming mark signal is determined by the length of time required to charge capacitor C1 to a point where the second inverter tube B2 is rendered conductive, such time being determined by the value of resistance R3 included in the charging circuit therefor.

As receipt of the incoming mark impulse is terminated (point *h*, Figure 2*p*), negative bias is removed from the control grid of the first inverter tube B1 which immediately becomes conductive. The sudden drop of potential which appears at plate P1 of the first inverter tube B1 at such time is transmitted over resistance R4 to the control grid G2 of the second inverter tube B2 to bias the tube B2 to cutoff.

As the second inverter tube B2 is thus rendered non-conductive, capacitor C2 immediately begins to charge over a circuit extending from positive battery over the portion of the resistance R3 to the right of the movable tap member and capacitor C2 to ground (Figure 2*t*).

After a predetermined length of time determined by the value of resistance included in the charging circuit, the rising potential reaches a point where the voltage impressed over resistances R26 and R25 to the control grid G5 becomes positive and the first flip-flop tube B5 is rendered conductive (point *k*, Figures 2*q* and 2*t*), the time period which elapses until such point is reached being determined by the value of the resistance included in the charging circuit for capacitor C2 by the tap on resistance R3.

As the flip-flop tube B5 is rendered conductive, an operating circuit is completed for the left hand winding of the output relay RE which extends from positive battery over resistance R15, the left hand winding of relay RE, flip-flop tube B5 and resistance R10 to ground. The output relay RE responsively moves its contacts to the spacing position and the outgoing impulse is terminated (point *k*, Figure 2*q*).

As the flip-flop tube B5 is rendered conductive, the resultant potential drop at its plate P5 appears at the control grid G6 of the second flip-flop tube B6, to effect biasing of tube B6 to cutoff.

It is apparent that a given portion of the outgoing signal is transmitted for a given time following the termination of receipt of the incoming signal, the length of this final delay (*f. p.*), Figure 2*q*, of transmission of the regenerated signal being determined by the position of the resistor R3. Thus, with the tap on the resistance R3 at the midpoint, the charge on capacitor C2 reaches the proper tripping value as the remaining one-half of the regenerated impulse is transmitted. Thus the initial delay period of a pulse is determined by the value of resistance to the left of the resistance tap, and the length of the outgoing pulse transmitted after the incoming impulse is terminated (*f. d.*) is determined by the value of resistance to the right of the resistor tap. With the tap or resistor R3 at the midpoint (and capacitors C1 and C2 being of the same values), the initial delay period and the final transmission period of the regenerated signal will be of equal value.

This relation is clearly illustrated in Figures 2*p* and 2*q* of the drawings in which the regenerated signal is initiated after half of the incoming signal has been received, and in which the regenerated signal continues after receipt of the incoming impulse for a time period equivalent to one-half the incoming impulse length; whereby the signal generator provides an outgoing impulse which is of a like length to that of the input signal pulse. However, a time delay in regeneration which is equivalent to one-half the length of the original impulse is suffered.

The manner in which adjustment of the resistor from its midpoint effects simultaneous, proportional, and compensating modifications of the outgoing signal by altering both the initial delay period and the final delay period are now described.

As is well known in the art, in the transmission of telegraph waves over radio links, the incoming carrier oscillations which are representative of the mark impulse are frequently elongated during transmission due to atmospheric conditions which are prevalent during certain periods of the day. According to the invention a signal regenerator is provided which is adjustable to various positions to compensate for the mean elongation of these signals which may have a mean elongation of length *v*, as illustrated in Figure 2*r*.

For example, during a period in which a series of signals having a mean elongation in the value of *v* are received, the tap on the adjustable resistor R3 is shifted to the right to increase the value of resistance in the charging circuit for capacitor C1 and to decrease the value in the charging current for capacitor C2. As a result when the elongated signals having the length of a plus *v* (Figure 2*r*) are received, the initial delay period for regeneration is delayed by a value of $$\frac{v}{2}$$

and the period of regeneration following termination of the incoming impulse is shortened by an amount of $$\frac{v}{2}$$

whereby the signal output of the signal regenerator will be a signal of normal length as set forth in Figure 2*s*.

The operation of the equipment with the tap on R3 properly readjusted to effect regeneration of a normal signal responsive to receipt of a normal signal and elongated by a value *v* will now be described. As the incoming carrier oscillations representative of an incoming elongated mark impulse are applied over the rectifier bridge to the first inverter tube B1, the tube B1 is immediately rendered non-conductive as heretofore described, and the capacitor C1 begins to charge over its charging circuit extending from positive battery, the resistance included in the charging circuit by left hand portion of resistor R3, and capacitor C1 to ground. As a result of the new setting of resistance R3, the rate of potential rise will be proportionately slower, and a greater time period will elapse prior to the time that the potential reaches the point where the control grid G2 of the second inverter tube B2 is rendered sufficiently positive to cause the second inverter tube B2 to strike. In that an outgoing pulse of the normal given length is desired, and since the outgoing impulse length is varied by two values (the described initial and final period alterations), the initial delay period must necessarily be such as to absorb one-half of the signal length which has been added to the transmitted pulse. With the resistor so adjusted, capacitor C3 now charges at a rate illustrated in Figure 2*u* of the drawings.

After an interval which is commensurate with the normal given initial delay time plus one-half of the length by which the incoming signal was elongated, the capacitor C1 reaches a value of potential which is effective to cause the inverter tube B2 to fire, flip-flop tube B5 to cutoff, and flip-flop tube B6 to fire.

The right hand winding of relay RE is responsively energized and the transmission of a mark impulse by the signal regenerator is initiated, such operation being indicated at point $m$ in Figure 2*s*. The incoming impulse ($a$ and $v$) maintains the equipment so energized for its duration.

As the incoming elongated impulse ($a$ plus $v$) is terminated, inverter tube B1 immediately fires, inverter tube B2 is rendered non-conductive and the charging circuit for capacitor C2 is completed.

Recalling that resistor R3 has been adjusted to provide an increased initial delay period and thus shorten the outgoing pulse by a value of $\frac{1}{2}v$, it is apparent that the value of resistance in the charging circuit for capacitor C2 has been proportionately changed (decreased), and as a result of the decreased resistance in the charging circuit, capacitor C2 is charged to the predetermined value of potential at a faster rate than is experienced in the signal regeneration operation. The reduction in the time period is directly proportional to the variation in the setting on the resistor R3, it being apparent from the disclosure of Figures 2*s* and 2*u* that the predetermined potential is reached after the elapse of a time period considered in Figure 2*q*

$$\left(\frac{a}{2}\right)$$

minus one-half of the length by which the incoming signal has been elongated ($v$).

As the predetermined value is reached, tube B5 fires, B6 is cutoff, and relay RE is operated to the spacing position (point $n$, Figure 2*s*). Thus the signal regenerator effects the output of a signal having a normal length responsive to receipt of a given normal signal which is elongated by a value $v$, one-half of the added length $v$ being absorbed by lengthening of the initial delay time and the other half by shortening of the final period of signal regeneration following termination of receipt of the incoming signal.

Mathematically expressed, the grid voltage at which the second inverter tube B2 is rendered conductive is attained after a time delay period which is equivalent to $$\frac{a+v}{2}$$

that is the normal given initial delay time (which is one-half the normal given impulse length) plus one half the portion of the length by which the incoming signal was elongated. As previously pointed out, the increase of the initial delay from $$\frac{a}{2} \text{ to } \frac{a+v}{2}$$

is of no interest to the analyzer, which is more concerned with the receipt of clear cut marks and spaces which do not run into each other. It is, of course, apparent that receipt of false signals, such as frequently created by atmospheric disturbances, which are shorter than the initial delay period determined by the setting of the tap on resistor R3 will have no effect on the signal regenerator, and the false transient signal is accordingly repulsed.

It was seen that the final period of outgoing signal generation, which in regeneration of a normal given signal is equivalent to one-half the normal signal length $$\left(\frac{a}{2}\right)$$

is now modified by the changed resistor setting, that is, the final period has been shortened by one-half of the length by which the signal was elongated, which expressed in formula is $$\frac{a}{2}-\frac{v}{2}$$

A specific example of the manner in which the setting of the resistor is operative to effect the transmission of signals of normal length responsive to receipt of elongated signals of a given mean value is illustrated in Figures 2*r'* and 2*s'*. Assuming that the received signals are elongated during given periods of the day by an added length of half its value as shown in Figure 2*r'* the incoming signal may then be expressed as $$a+\frac{a}{2}$$

To accomplish the output of a signal of the given length responsive to receipt of such elongated signal $$\left(a+\frac{a}{2}\right)$$

the resistor R3 is accordingly adjusted to provide an initial delay of $$\frac{3a}{4}$$

and a final delay of $$\frac{a}{4}$$

as will appear from the following formulae.

As shown hereinbefore, resistor R3 is adjusted so that one-half of the elongated portion of the signal is absorbed in the initial delay period. Since this period is normally one-half the normal impulse length $$\left(\frac{a}{2}\right)$$

the initial delay as now provided by the resistor should be $$\frac{a}{2}+\frac{v}{2}$$

By substitution, of $$\frac{a}{2}$$

(the added length of the assumed impulse) for $v$ the resistor is properly set to provide an initial delay of $$\frac{a}{2}+\frac{\frac{a}{2}}{2}=\frac{3a}{4}$$

Similarly, the final period of impulse transmission when the resistor R3 is adjusted to compensate for elongated signals having an added portion of $v$, has been shown to be $$fp=\frac{a}{2}-\frac{v}{2}$$

by substitution in the present example, in which $v$ has been assumed to be $$\frac{a}{2}$$

the formula now becomes $$\frac{a}{2}-\frac{\frac{a}{2}}{2}=\frac{a}{4}$$

With reference now to Figure 2s' there is illustrated thereat the manner in which a signal of normal length is provided by the signal regenerator responsive to receipt of an impulse which is elongated by a value of one-half its length. Specifically, an initial delay period of ¾ of the impulse length expires before the incoming impulse becomes effective with respect to the transmission of an outgoing pulse by the signal regenerator. Since the incoming signal is equivalent to $$a+\frac{a}{2}(1\tfrac{1}{2}a)$$

and ¾ of the impulse has been absorbed by the initial delay period, only ¾ of the incoming impulse is left for use in generating the outgoing pulse (Figure 2s). The remaining outgoing pulse period is effected by the final generating period which is $$\frac{a}{4}$$

as shown. Thus the output of signal generator is $\frac{3}{4}a+\frac{1}{4}a$, or an impulse of the given signal length $a$.

It is, of course, realized that during the periods in which the elongations are present during the day, the incoming signals are not all elongated by the predetermined mean value, and the outgoing signals vary in accordance therewith. As pointed out heretofore, it is an important function of the signal regenerator to provide a positively shaped pulse on receipt of a mark signal to insure proper operation of the analyzer. A given delay or slight variations in the length of the impulse are not as important as the provision of clear cut marks and spaces so that the proper lines of division will be evidenced therebetween in the signals as regenerated.

Figure 2r'' illustrates the length of a normal incoming impulse $a$ and Figure 2s'' illustrates the output of the signal regenerator responsive to receipt of such normal signal $a$ when the tap on the variable resistor R3 is set to compensate for receipt of mean signals of approximately 1½ times the transmitted signal length.

As pointed out heretofore, with the signal regenerator so adjusted, an initial delay of ¾ of the signal length will be introduced prior to generation of the outgoing signal. Thus with the receipt of a signal of normal length, only ¼ of the incoming signal will be left for effective generation of an outgoing signal. Thus an outgoing signal of $$\frac{a}{2}$$

is provided (one-half the transmitted signal length), and the remaining quarter of the outgoing impulse being that portion which effects the final period of the outgoing impulses as a result of the presently assumed setting of the resistor R3.

With the same setting for the resistor R3, the equipment will respond to the receipt of a signal which is elongated by an even greater amount, in the manner shown in Figures 2r''' and 2s'''. Practically speaking, the signal regenerator is adapted to respond to an incoming signal which is twice the normal signal length ($2a$). However, for technical consideration provision of a space time between successive marks must be made and the operating time of the output relay RE must therefore be taken into consideration. Assuming such operating time to be of a time interval designated by $\delta$, the maximum signal elongation which is interpretable by the signal generator will be a signal which is elongated by its own length minus the value $\delta$. In such event, the equipment is operative to provide an output impulse which is expressed by the formula $\frac{5}{4}a-\delta$. An incoming signal of this nature is entirely unanalyzable by former methods and apparatus.

The aforedescribed considerations have been directed to the manner in which duration of incoming signals are shortened to a required length prior to use. It is obvious that the equipment can also be considered as lengthening incoming space signals which are shorter than the transmitted length $a$.

The described apparatus effects compensation for undesirable elongations and fadings of signal elements such as is frequently encountered in the transmission of telegraph waves in an extremely reliable and flexible manner. Additionally, the invention provides a unit in which impulse distortion extending over a large range may be accomplished by the mere movement of the tap of a single resistor element to various points along its length. Simplicity and accuracy are definite attributes of the arrangement.

The basic concepts of the signal generator of the invention are also adaptable for use in the telegraphy system of the double wave type and the manner of its adaptation is set forth in Figure 3 of the drawings. The general characteristics of a double wave receiver have been set forth in my co-pending application entitled "System for Transmission of Telegraph Signs on a Radio Path by Means of a Double Wave," which was filed January 15, 1948, under Serial No. 2,438, and only brief disclosure of the adaptation is believed necessary at this point.

With reference to Figure 3, the currents of mark and space frequency are introduced by the receiver equipment to the signal generator alternately over the transformer M (mark) or the transformer S (space). It is apparent that the two different paths, that is the marking frequency path indicated by the letter M and the space frequency path indicated by the letter S are extended over separate paths comprising a bridge rectifier and inverter tube arrangement similar to that set forth in Figure 1. The outputs of the inverter arrangements of each of the separate paths are connected to control a single flip-flop tube circuit arrangement which, in turn, controls the output relay Z for the signal regenerator unit (the identifying numerals of Figure 1 have been used to identify similar elements in Figure 3, the sub-letters M and S being used to identify the particular path in which the element appears).

Specifically, the output side of the inverter tube B1M and B2M in the marking path is connected over capacitor CMF and the output side of the inverter tubes of the spacing path is connected to the flip-flop arrangement over capacitor CSF.

Each of the flip-flop tubes B7 and B8 in this arrangement include a plate P7, P8; a screen grid SG7, SG8; a control grid CG7, CG8; and a cathode Ca7, Ca8. Plate P7 is connected to a positive source of potential over resistance R17 and the left hand winding Z1 of the polarised output relay Z. Screen grid SG7 is connected to junction point of resistance network comprising resistances R17, R18 connected between the source of positive potential and ground. Control grid CG7 is connected to the output side of the marking path over a network comprising capacitor CMF and resistor R20 which is connected to ground. The control grid CG7 is also connected over resistance R19 to a point in the plate circuit for the second flip-flop tube B8. Cathode Ca7 is connected over the junction point of a pair of resistances R24 and R21 which are connected between battery and ground.

Plate P8 of the second flip-flop tube B8 is connected over resistance R18 and the right hand winding Z2 of the output relay Z to a positive source of potential. Screen grid SG8 is connected to the screen grid SG7 of the first flip-flop tube and the resistance network R17, R18. Control grid CG8 is connected to the output side of the space path by means of a circuit comprising capacitor CSF and resistor R23. Control grid CG8 is also connected to the plate circuit of the first flip-flop tube by resistor R22; cathode Ca8 is connected to a resistor network consisting of resistors R21 and R24, which are in turn connected between a source of positive potential and ground.

Operation of the equipment, which is complementary to that of Figure 1, is effected in the manner heretofore described.

Briefly, with the receipt of the marking frequency at the receiver, oscillations representative of the mark will be imposed upon the transformer M for the duration of the incoming frequency. Similarly, with the receipt of the spacing frequency, the oscillations are impressed on the transformer S in the spacing path.

Assuming receipt of a marking impulse, the rectifier bridge connected to the secondary of transformer M impresses a negative potential upon the control grid of the first tube B1M to bias the tube to cutoff and to effect the charging of capacitor C1M over resistance R3M from the positive source of potential.

After a predetermined time which is established by the setting of the resistor R3M, the potential impressed across resistance R4M and on the control grid G2M of the second inverter tube, will reach a point where the control grid is rendered positive and tube B2M will fire. This period of delay is the initial delay period described hereinbefore, and is determined by the setting on the resistor R3M.

With the striking of tube B2M the drop in potential appearing in the plate circuit appears across the resistor network comprising resistor R26M and R25M and is extended across the differentiating circuit comprising capacitor CMF and resistance R20 to effect the transmission of a tripping impulse to the control grid CG7 of the first flip-flop tube B7.

With receipt of the negative impulse on the control grid CG7 of the first tube B7, the tube B7 is rendered nonconductive and the rising potential appearing in the plate circuit thereof is transmitted over resistance R22 to the control grid CG8 of the second flip-flop tube B8 to render the tube conductive. As the tube B8 conducts, an operating circuit is completed for the right hand winding Z2 of the output relay Z, which extends from positive battery over resistance R18, the right hand winding Z2 of the output relay Z, the conducting flip-flop tube B8 and resistance R24 to ground. The triggering impulse as transmitted over the circuit continues for a period determined by the setting of the adjustable resistor R3M and the length of the incoming impulse.

The operation of the equipment in the spacing path is of a similar nature, the output of the inverter stage thereof being impressed across the differentiating circuit comprising capacitor CSF and resistance R23 to control grid CG8 of the second flip-flop tube B8 as the spacing element is received. The duration of the triggering impulse transmitted to the flip-flop arrangement is determined by the length of the incoming impulse and the space impulse and the setting of the resistor R3S.

It is apparent from the foregoing that the pulse adjusting equipment in the marking and spacing paths control the flip-flop arrangement and the ountput relay Z to regenerate the impulse signals of the desired length, the correction of the distorted incoming pulses being accomplished by mere adjustment of its associated pulse adjustment resistor means.

While I have illustrated and described what I regard to be the preferred embodiment of my invention, nevertheless it will be understood that such is merely exemplary and that numerous modifications and rearrangements may be made therein without departing from the essence of the invention.

I claim:

1. Electrical signal generator apparatus for reforming mutilated signals to an initial given value comprising impulse generating means for generating an outgoing signal impulse responsive to receipt of a corresponding incoming signal impulse, a first timing means operative to introduce a period of delay prior to generation of each outgoing impulse by said generating means, a second timing means operative to maintain said signal generating means operative for an additional period following termination of receipt of said incoming signal, and control means for adjusting the operating periods of said first and second timing means to vary the values of said initial delay period and said additional period to thereby provide an outgoing signal having said desired given value in response to receipt of a mutilated signal.

2. Electrical signal generator apparatus for reforming mutilated signals to an initial given value comprising impulse generating means for generating an outgoing signal impulse responsive to receipt of corresponding incoming signal impulse, a first timing means operative to introduce a period of delay prior to generation of each outgoing impulse by said generating means, a second timing means operative to maintain said signal generating means operative for an additional period following termination of receipt of said incoming signal, and a common control means for simultaneously adjusting said first and second timing means to vary the value of said initial delay period and said additional generating period in a predetermined complementary compensatory manner.

3. An arrangement as set forth in claim 2 in which said common control means has a neutral setting point for controlling said generator to provide a signal of a given value responsive to receipt of a signal having a duration of said given value, and in which said control means is movable in a first direction from said neutral point to effect generation of an outgoing signal of said given value responsive to receipt of a signal of a greater length than said given value and is movable in a second direction to provide outgoing signals of said given value responsive to receipt of a signal of a shorter duration than said given value.

4. Electrical signal generator apparatus for reforming multilated signals to an initial given value comprising impulse generating means for generating an outgoing signal impulse of duration equivalent to that of a corresponding incoming signal impulse, a first timing means operative to introduce a period of delay prior to generation of each outgoing impulse by said generating means, a second timing means operative to maintain said signal generating means operative for an additional period following termination of receipt of said incoming signal, and common control means for simultaneously varying said initial delay period and said additional period of said repeated impulse by an amount, the algebraic sum of which is equal and opposite in value to the variation of said mutilated incoming signal from said given value.

5. A signal generating apparatus as set forth in claim 4 in which said first and second timing means comprise a first and second RC circuit, and said common control means comprises a common resistance interconnected in said first and second RC circuits to effect said complementary and simultaneous adjustment of the durations of said initial and additional periods.

6. Electrical signal generator apparatus for reforming mutilated signals to an initial given value comprising impulse generating means for generating an outgoing signal impulse responsive to receipt of a corresponding incoming signal impulse, a first resistance-capacitor timing circuit arranged to introduce a period of delay prior to generation of each outgoing impulse by said generating means, a second resistance capacitor circuit operative to maintain said signal generating means operative for an additional period following cessation of said incoming signal, a resistor means common to both of said circuits, and control means for adjusting said value of said common resistance for said first and second circuits to vary the values of said initial delay period and said additional period in a complementary manner, movement of said control means in one direction from a given common point effecting a proportional reduction of said initial delay period and a proportional lengthening of the portion of the outgoing pulse generated subsequent to termination of receipt of the incoming pulse, whereby incoming signals shortened by a mean value may be lengthened to said given signal value at the output side of said generator; and movement of said control means from said common midpoint in the other direction effecting a proportional lengthening of the initial delay period and a proportional shortening of the portion of the outgoing pulse generated subsequent to termination of receipt of the incoming pulse, whereby incoming signals lengthened by a mean value may be reproduced as signals of said given value.

7. Electrical signal generator apparatus for reforming mutilated signals to an initial given value comprising impulse generating means including an output relay for generating an outgoing signal impulse responsive to receipt of a corresponding incoming signal impulse, a first timing means operative to introduce a period of delay prior to generation of each outgoing impulse by said generating means, a second timing means operative to maintain said signal generating means operative for an additional period following termination of receipt of said incoming signal, and control means for adjusting said first and second timing means to vary the values of said initial delay period and said additional period to operate said relay in the provision of an outgoing signal having said given value in response to receipt of a mutilated signal which lies in a range extending from unit impulses to impulses of a length of two times said given length minus the operating time of said output relay.

8. Electrical signal generator apparatus for reforming mutilated signals to an initial given value comprising impulse generating means for generating an outgoing signal impulse responsive to receipt of a corresponding incoming signal impulse, a first timing means operative to introduce a predetermined period of delay prior to generation of each outgoing impulse by said generating means, a second timing means operative to maintain said signal generating means operative for an additional predetermined period following termination of receipt of said incoming signal, and control means for adjusting said first and second timing means to effect in response to receipt of a mutilated signal having a duration which is longer than said given value by a value V, the lengthening of the value of said predetermined initial delay period by one half the value V and the shortening of the additional predetermined period by one half the value V.

9. Electrical signal generator apparatus for reforming mutilated signals to an initial given value comprising impulse generating means for generating an outgoing signal impulse responsive to receipt of a corresponding incoming signal impulse, a first timing means operative to introduce a predetermined period of delay prior to generation of each outgoing impulse by said generating means, a second timing means operative to maintain said signal generating means operative for an additional predetermined period following termination of receipt of said incoming signal, and control means for adjusting said first and second timing means to effect in response to receipt of a mutilated signal having a duration which is shorter than said given value by a value V, the shortening of the value of said predetermined initial delay period by a value of one half said difference V and the lengthening of said predetermined additional period by the value of one half of said difference V.

10. Electrical signal generator apparatus for providing a signal of a given length responsive to receipt of mutilated signal comprising impulse generating means for generating an outgoing signal impulse responsive to receipt of a corresponding incoming signal impulse, said signal generating means comprising an input stage for receiving incoming impulses, an inverter stage comprising a pair of electronic tube means connected in inverted relation, one of said tubes being normally biassed to conduct and the other of said tubes being normally biassed to cutoff, means in said input stage for providing a potential output responsive to receipt of an incoming impulse to bias said one tube in said inverter stage to cutoff and said other tube to conduct, a first timing means operative to introduce a period of delay in the operation of said first tube responsive to receipt of said output potential, a second timing means operative to maintain said tubes in said last condition for an additional period following termination of receipt of said incoming signal, control means for adjusting said first and second timing means to vary the values of said initial delay period and said additional period of operation in a simultaneous and complementary manner, and an output stage including electronic tube means and a relay unit for transmitting an outgoing impulse for the duration said inverter stage is maintained in said last operated condition.

11. Electrical signal generator apparatus for reforming mutilated signals to an initial given value comprising impulse generating means operative responsive to receipt of an incoming signal impulse to provide an outgoing impulse of equal duration with said incoming impulse only after the elapse of a predetermined initial delay period; and signal adjusting means for proportionately varying the initial period of delay effected prior to signal regeneration and the period of generation effected after cessation of the incoming impulse.

12. A signal generator as claimed in claim 11 which includes means for preventing response of said signal regenerator responsive to receipt of an incoming impulse which is of shorter duration than the initial period of delay provided by said signal adjusting means in its setting at the time of receipt of the incoming signal.

13. Electrical signal generator apparatus for providing a signal of a predetermined length responsive to receipt of a mutilated signal including an input circuit over which the incoming impulses are received, a two-conditioned electronic switching means normally in its first condition connected to said input circuit to be operated to said second condition during the periods of receipt of a signal over said input circuit, a second electronic switching means also having a normal condition and a second condition, and connected to be operated to its second condition responsive to operation of said first electronic switching means to its second condition, output signalling means for generating an output signal responsive to operation of said second electronic switching means to its second condition, a first time delay means for introducing a predetermined delay between the operation of said first electronic switching means to its second condition and the operation of the second electronic switch to its second condition, whereby a period of delay is introduced prior to generation of the output signal, and a second time delay means controlled by said second electronic switching means to introduce a time delay between the time of operation of the second electronic switching means to its normal condition responsive to termination of receipt of the incoming impulse, and the restoration of said signalling means to terminate signal transmission.

14. An electrical signal generator apparatus for providing a signal of a predetermined length responsive to the receipt of mutilated signal including an input circuit over which the incoming impulses are received, a first electronic tube switching means normally biased to cut-off, means for connecting said first tube to said input circuit and for biasing same to conduct during the period of receipt of an incoming signal over said input circuit, a second electronic tube switching means normally biased to conduct and connected to be biased to cut-off responsive to conductivity by said first electronic tube switching means, output signalling means for generating an output signal responsive to biasing of the second electronic tube switching means to cut-off, a first time delay means for introducing a predetermined delay between the time said first tube means is biased to cut-off and said second tube means is rendered conductive including a capacitor-resistance circuit means for completing a charging circuit to said capacitor over said resistance responsive to cut-off of said first tube means, and circuit control means for effecting biasing of said second tube means to conduct as said potential on said capacitor approaches a predetermined value; and a second time delay means for maintaining said output signalling means operative for an additional period following termination of receipt of said incoming impulse comprising a second capacitor-resistor circuit, means for completing a charging circuit to said second capacitor over its associated resistance responsive to biasing of said second tube means to cut-off, and means for terminating operation of said output signalling means responsive to the increase of said charge on said second capacitor to a predetermined value.

15. An arrangement as set forth in claim 14 which includes a common control member for simultaneously adjusting the value of the resistance in said first and second resistor-capacitor circuits to effect complementary and simultaneous adjustment of the period of duration of said initial and additional delay periods.

16. Electrical signal generator apparatus for reforming received marking and spacing signals to an initial given value comprising a first path for incoming marking frequencies and a second path for incoming spacing frequencies, impulse generating means for generating outgoing marking and spacing impulses responsive to receipt of corresponding marking and corresponding spacing impulses, a first timing means connected in said marking path operative to introduce a period of delay prior to generation of each corresponding outgoing marking impulse by said generating means, a second timing means operative to maintain said signal generating means operative for an additional period following termination of receipt of said incoming marking signal, and control means for adjusting the operating periods of said first and second timing means to vary the value of the initial delay period and the additional period of said outgoing marking signal; a third timing means connected in said space path to introduce a period of delay prior to generation of each outgoing spacing impulse by said generating means, a fourth timing means connected on said space path operative to maintain said signal generating means operative for an additional period following termination of receipt of said incoming spacing signal, and control means for adjusting the operating periods of said first and second timing means to vary the value of said initial delay period and said additional generating period for said outgoing spacing impulses.

HENDRIK C. A. VAN DUUREN.

References Cited in the file of this patent

UNITED STATES PATENTS

| Number | Name | Date |
|---|---|---|
| 2,422,231 | Francis et al. | June 17, 1947 |
| 2,470,677 | Anderson | May 17, 1949 |
| 2,470,722 | Rattner | May 17, 1949 |
| 2,479,652 | Vilkomerson | Aug. 23, 1949 |
| 2,515,052 | Mitchell | July 11, 1950 |
| 2,552,362 | Adams | May 8, 1951 |